US010090521B2

(12) United States Patent
Kodato et al.

(10) Patent No.: US 10,090,521 B2
(45) Date of Patent: Oct. 2, 2018

(54) LITHIUM ION BATTERY WITH NEGATIVE ELECTRODE IN WHICH STATE OF CHARGE AT A POTENTIAL TO BE 0.1 V WITH RESPECT LITHIUM POTENTIAL IS 60% OR MORE, AND POSITIVE ELECTRODE HAVING A DENSITY POSITIVE ELECTRODE COMPOSITE OF 2.4 TO 2.7 G/CM$^3$

(71) Applicant: Hitachi Chemical Company, LTD., Tokyo (JP)

(72) Inventors: Katsunori Kodato, Tokyo (JP); Eisuke Haba, Tokyo (JP); Mie Abe, Tokyo (JP)

(73) Assignee: HITACHI CHEMICAL COMPANY, LTD., Tokyo (JP)

( * ) Notice: Subject to any disclaimer, the term of this patent is extended or adjusted under 35 U.S.C. 154(b) by 0 days.

(21) Appl. No.: 15/317,879

(22) PCT Filed: Jun. 9, 2015

(86) PCT No.: PCT/JP2015/066599
§ 371 (c)(1),
(2) Date: Dec. 9, 2016

(87) PCT Pub. No.: WO2015/190482
PCT Pub. Date: Dec. 17, 2015

(65) Prior Publication Data
US 2017/0133676 A1 May 11, 2017

(30) Foreign Application Priority Data

Jun. 10, 2014 (JP) .................................. 2014-119171

(51) Int. Cl.
*H01M 4/13* (2010.01)
*H01M 4/505* (2010.01)
(Continued)

(52) U.S. Cl.
CPC ........... *H01M 4/505* (2013.01); *H01M 4/131* (2013.01); *H01M 4/366* (2013.01); *H01M 4/525* (2013.01);
(Continued)

(58) Field of Classification Search
CPC .. H01M 4/505; H01M 4/525; H01M 10/0525; H01M 4/366; H01M 4/131; H01M 2004/028
(Continued)

(56) References Cited

U.S. PATENT DOCUMENTS

2004/0062995 A1  4/2004  Yanagida et al.
2009/0206704 A1  8/2009  Kitamura
(Continued)

FOREIGN PATENT DOCUMENTS

CN    103441305 A    12/2013
JP    2004-146363 A    5/2004
(Continued)

OTHER PUBLICATIONS

International Search Report for PCT/JP2015/066599 dated Sep. 15, 2015; English translation submitted herewith (4 Pages).

*Primary Examiner* — Gary Harris
(74) *Attorney, Agent, or Firm* — Fitch, Even, Tabin & Flannery, LLP (57) ABSTRACT

A lithium ion battery includes: a negative electrode in which a state of charge at a potential to be 0.1 V with respect to a lithium potential is 60% or more; and a positive electrode containing a lithium-containing composite metal oxide, and a capacity ratio of the positive electrode and the negative electrode (negative electrode capacity/positive electrode capacity) is 1 or more and less than 1.2. In the lithium ion battery described above, the lithium-containing composite metal oxide contains layered lithium nickel manganese
(Continued)

cobalt composite oxide (NMC) and spinel lithium manganese oxide (sp-Mn).

6 Claims, 4 Drawing Sheets

(51) Int. Cl.
*H01M 4/131* (2010.01)
*H01M 4/525* (2010.01)
*H01M 10/0525* (2010.01)
*H01M 4/36* (2006.01)
*H01M 4/02* (2006.01)

(52) U.S. Cl.
CPC .. *H01M 10/0525* (2013.01); *H01M 2004/028* (2013.01)

(58) Field of Classification Search
USPC .......................................................... 429/233
See application file for complete search history.

(56) References Cited

U.S. PATENT DOCUMENTS

| | | | |
|---|---|---|---|
| 2010/0279172 | A1 | 11/2010 | Hwang et al. |
| 2014/0117940 | A1* | 5/2014 | Takahata ................. H01M 4/13 320/134 |
| 2014/0322576 | A1 | 10/2014 | Okumura et al. |
| 2014/0370346 | A1 | 12/2014 | Okumura et al. |

FOREIGN PATENT DOCUMENTS

| | | | |
|---|---|---|---|
| JP | 2005-243448 A | | 9/2005 |
| JP | 2009-266706 A | | 11/2009 |
| JP | 2009-266708 A | | 11/2009 |
| JP | 2009266708 A | * | 11/2009 |
| JP | 2010-262914 A | | 11/2010 |
| JP | 2013-222587 A | | 10/2013 |
| WO | 2013/128676 A1 | | 9/2013 |
| WO | 2013/128677 A1 | | 9/2013 |
| WO | 2014/103166 A1 | | 7/2014 |

* cited by examiner

LITHIUM ION BATTERY WITH NEGATIVE ELECTRODE IN WHICH STATE OF CHARGE AT A POTENTIAL TO BE 0.1 V WITH RESPECT LITHIUM POTENTIAL IS 60% OR MORE, AND POSITIVE ELECTRODE HAVING A DENSITY POSITIVE ELECTRODE COMPOSITE OF 2.4 TO 2.7 G/CM³

CROSS-REFERENCE TO RELATED APPLICATIONS

This application is a U.S. national phase application filed under 35 U.S.C. § 371 of International Application No. PCT/JP2015/066599, filed Jun. 9, 2015, designating the United States, and claims priority from Japanese Patent Application No. 2014-119171, filed Jun. 10, 2015, and the complete disclosures of which applications are hereby incorporated herein by reference in their entirety for all purposes.

TECHNICAL FIELD

The present invention relates to a lithium ion battery.

BACKGROUND ART

The lithium ion battery is a secondary battery with a high energy density, and is used for a power source of portable devices such as a notebook computer and a mobile phone by taking advantage of its characteristics. There are various types in the shape of the lithium ion battery, and a wound-type structure of a positive electrode, a negative electrode, and a separator is adopted in a cylindrical lithium ion battery. For example, a positive electrode material and a negative electrode material are each applied to two sheets of belt-like metal foils, a separator is interposed therebetween, and a laminated body thus obtained is wound spirally, thereby forming a wound group. This wound group is housed in a cylindrical battery can used as a battery container, and is sealed after electrolytic solution is injected therein, so that a cylindrical lithium ion battery is formed.

Regarding the cylindrical lithium ion battery, a 18650 lithium ion battery has been widespread as a lithium ion battery for consumer use. An outer size of the 18650 lithium ion battery is as small as about 18 mm in diameter and about 65 mm in height. Lithium cobalt oxide characterized by a large capacity and long life is mainly used for a positive electrode active material of the 18650 lithium ion battery, and the battery capacity is approximately 1.0 Ah to 2.0 Ah (3.7 Wh to 7.4 Wh) in general.

In recent years, it is expected that the lithium ion battery is developed not only for the consumer use in portable devices and the like, but also for the use of large-scale energy storage system for natural power sources such as photovoltaic power generation and wind power generation. The large-scale energy storage systems require an amount of electric power per system in an order of magnitude of several megawatts/hour (MWh).

For example, Patent Document 1 listed below discloses a cylindrical lithium ion battery which includes, in a cylindrical battery container, an electrode wound group in which a positive electrode, a negative electrode, and a separator are wound. This battery has a discharge capacity of 30 Ah or larger, a positive electrode active material composite containing lithium manganese composite oxide is used for a positive electrode, and a negative electrode active material composite containing amorphous carbon is used for a negative electrode.

RELATED ART DOCUMENTS

Patent Documents

Patent Document 1: WO 2013/128677

SUMMARY OF THE INVENTION

Problems to be Solved by the Invention

A lithium ion battery has been drawing attention as a high input/output power source used for an electric car, a hybrid electric car and the like. In the application to the field of automobile like this, excellent input characteristics for an improvement in the utilization efficiency of energy by regeneration are also required in addition to a higher output, a larger capacity and a longer life.

However, the result of studies by the inventors of the present invention has clarified that the input characteristics of the lithium ion battery described in Patent Document 1 are not sufficient.

The present invention has been made in view of the problems described above, and an object of the present invention is to provide a lithium ion battery having excellent input/output characteristics.

Means for Solving the Problems

Specific means for solving the problems are as follows. <1> A lithium ion battery including: a negative electrode in which a state of charge at a potential to be 0.1 V with respect to a lithium potential is 60% or more; and a positive electrode containing lithium-containing composite metal oxide, in which a capacity ratio of the positive electrode and the negative electrode (negative electrode capacity/positive electrode capacity) is 1 or more and less than 1.2. <2> The lithium ion battery according to <1>, in which the lithium-containing composite metal oxide contains layered lithium nickel manganese cobalt composite oxide (NMC) and spinel lithium manganese oxide (sp-Mn). <3> The lithium ion battery according to <2>, in which a mass ratio (NMC/sp-Mn) of the layered lithium nickel manganese cobalt composite oxide (NMC) and the spinel lithium manganese oxide (sp-Mn) is 10/90 or more and 65/35 or less.

Effects of the Invention

The present invention can provide a lithium ion battery having excellent high input/output characteristics.

DETAILED DESCRIPTION OF PREFERRED EMBODIMENTS

In the case where a range is indicated as A to B in the following embodiment, it is assumed to be A or more and B or less unless otherwise specified.

(Embodiment)

First, summary of a lithium ion battery will be briefly described. The lithium ion battery has a positive electrode, a negative electrode, a separator, and an electrolytic solution in a battery container. The separator is disposed between the positive electrode and the negative electrode.

When the lithium ion battery is charged, a battery charger is connected between the positive electrode and the negative electrode. At the time of the charging, lithium ions inserted in a positive electrode active material are desorbed, and released into the electrolytic solution. The lithium ions released into the electrolytic solution move in the electrolytic solution, pass through a separator made of fine porous films, and reach the negative electrode. The lithium ions which have reached the negative electrode are inserted into a negative electrode active material which constitutes the negative electrode.

When the battery is discharged, an external load is connected between the positive electrode and the negative electrode. At the time of the discharging, lithium ions which have been inserted into the negative electrode active material are desorbed and released into the electrolytic solution. At this time, electrons are released from the negative electrode. Then, the lithium ions released into the electrolytic solution move in the electrolytic solution, pass through the separator made of fine porous films, and reach the positive electrode. The lithium ions which have reached the positive electrode are inserted into the positive electrode active material which constitutes the positive electrode. At this time, by the lithium ions being inserted into the positive electrode active material, electrons flow into the positive electrode. In this way, discharging is performed by the electrons moving to the positive electrode from the negative electrode.

As described above, by inserting and desorbing lithium ions between the positive electrode active material and the negative electrode active material, the battery can be charged and discharged. Note that a configuration example of the actual lithium ion battery will be described later (for example, see FIG. 1).

Next, the positive electrode, the negative electrode, the electrolytic solution, the separator, and other constituent parts which are constituent elements of the lithium ion battery of the present embodiment will be sequentially described below.

1. Positive Electrode

In the present embodiment, a positive electrode described below is provided as a positive electrode applicable to the high-input and high-output lithium ion battery having a large capacity. The positive electrode (positive electrode plate) of the present embodiment is made up of a current collector and a positive electrode composite (positive electrode mixture) formed on the current collector. The positive electrode composite is a layer which is provided on the current collector and contains at least the positive electrode active material. For the positive electrode active material, any material commonly used in this field may be used, and examples thereof include lithium-containing composite metal oxide, olivine type lithium salt, chalcogen compound, and manganese dioxide. The lithium-containing composite metal oxide is metal oxide containing lithium and a transition metal or metal oxide in which part of the transition metal in the foregoing metal oxide is replaced with a different element. Examples of the different element include Na, Mg, Sc, Y, Mn, Fe, Co, Ni, Cu, Zn, Al, Cr, Pb, Sb, and B, among which Mn, Al, Co, Ni, Mg, and the like are preferred. One of the different elements may be used alone or two or more of the different elements may be used in combination. Among these, lithium-containing composite metal oxide is preferably used. Examples of the lithium-containing composite metal oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$, $Li_xMn_{2-y}M_yO_4$, $LiMPO_4$, and $Li_2MPO_4F$ (M is at least one element selected from the group including Na, Mg, Sc, Y, Mn, Fe, Co, Ni, Cu, Zn, Al, Cr, Pb, Sb, V, and B and x=0 to 1.2, y=0 to 0.9, and z=2.0 to 2.3). Herein, the value x representing the molar ratio of lithium increases or decreases by charging and discharging. In addition, examples of the olivine type lithium salt include $LiFePO_4$. Examples of the chalcogen compound include titanium disulfide and molybdenum disulfide. One of the positive electrode active materials may be used alone or two or more of the positive electrode active materials may be used in combination.

It is more preferred to contain a mixed active material of layered lithium nickel manganese cobalt composite oxide (NMC) and spinel lithium manganese oxide (spinel lithium manganese composite oxide, sp-Mn) as the positive electrode active material from a viewpoint of a large capacity and safety.

In addition, from a viewpoint of the larger capacity, longer life, and higher input and output of the battery while guaranteeing the safety, NMC/sp-Mn corresponding to a mass ratio (mixing ratio) of the layered lithium nickel manganese cobalt composite oxide (NMC) and the spinel lithium manganese oxide (sp-Mn) is preferably set to 10/90 or more and 65/35 or less. The mass ratio may be simply referred to as "mass ratio of active material". From the above viewpoint, NMC/sp-Mn is more preferably set to 20/80 or more and 60/40 or less, and still more preferably set to 30/70 or more and 55/45 or less.

Further, as the layered lithium nickel manganese cobalt composite oxide (NMC), it is preferred to use the material represented by the following composition formula (Chem. 1).

$$Li_{(1+\delta)}Mn_xNi_yCo_{(1-x-y-z)}M_zO_2 \quad \text{(Chem. 1)}$$

In the above-mentioned composition formula (Chem. 1), (1+δ) denotes a composition ratio of Li (lithium), x denotes a composition ratio of Mn (manganese), y denotes a composition ratio of Ni (nickel), and (1-x-y-z) denotes a composition ratio of Co (cobalt). Also, z denotes a composition ratio of an element M. The composition ratio of O (oxygen) is 2.

The element M is at least one element selected from a group including Ti (titanium), Zr (zirconium), Nb (niobium), Mo (molybdenum), W (tungsten), Al (aluminum), Si (silicon), Ga (gallium), Ge (germanium), and Sn (tin).

Here, −0.15<δ<0.15, 0.1<x≤0.5, 0.6<x+y+z≤1.0, and 0≤z≤0.1 are satisfied.

Also, as the spinel lithium manganese oxide (sp-Mn), it is preferred to use the material represented by the following composition formula (Chem. 2).

$$Li_{(1+\eta)}Mn_{(2-\lambda)}M'_\lambda O_4 \quad \text{(Chem. 2)}$$

In the above-mentioned composition formula (Chem. 2), (1+η) denotes a composition ratio of Li, (2−λ) denotes a composition ratio of Mn, and λ denotes a composition ratio of an element M'. The composition ratio of O (oxygen) is 4.

The element M' is at least one element selected from a group including Mg (magnesium), Ca (calcium), Sr (strontium), Al, Ga, Zn (zinc), and Cu (copper).

Here, $0 \leq \eta \leq 0.2$ and $0 \leq \lambda \leq 0.1$ are satisfied.

As described above, by using a mixture of the layered lithium nickel manganese cobalt composite oxide (NMC) and the spinel lithium manganese oxide (sp-Mn) as the active material for the positive electrode (positive electrode active material), even in the case of increasing the capacity, the stability of the positive electrode at the time of charging can be enhanced and the heat generation can be suppressed. As the result, it is possible to provide a battery excellent in the safety. Furthermore, it is also possible to enhance charging/discharging cycle characteristics and preservation characteristics.

As the element M' in the above-mentioned composition formula (Chem. 2), it is preferred to use Mg or Al. By using Mg or Al, the battery life can be extended. In addition, the safety of the battery can be enhanced.

In the case where the spinel lithium manganese oxide (sp-Mn) is used as the positive electrode active material, Mn in the compound is stable in a state of charge, and it is thus possible to suppress the heat generation due to a charging reaction. Accordingly, it is possible to enhance the safety of the battery. More specifically, it is possible to suppress the heat generation in the positive electrode and enhance the safety of the battery.

Furthermore, since it is possible to reduce the elution of Mn by adding the element M', preservation characteristics and charging/discharging cycle characteristics can be enhanced.

As described above, the spinel lithium manganese oxide (sp-Mn) has useful characteristics, but the spinel lithium manganese oxide (sp-Mn) itself has small theoretical capacity, and a density thereof is also small. Therefore, in the case where the battery is constituted by using only the spinel lithium manganese oxide (sp-Mn) as the positive electrode active material, it is difficult to increase the battery capacity (discharge capacity). On the other hand, the layered lithium nickel manganese cobalt composite oxide (NMC) has a large theoretical capacity, and has the theoretical capacity equivalent to that of $LiCoO_2$ which is widely used as the positive electrode active material of the lithium ion battery.

Hereinafter, the positive electrode composite and the current collector will be described in detail. The positive electrode composite contains a positive electrode active material, a binding material and the like, and is formed on the current collector. The forming method thereof is not particularly limited, and for example, it is formed in the following manner. That is, the positive electrode active material, the binding material, and other materials such as a conducting material and a thickening agent which are used as necessary are mixed in a dry method and formed into a sheet-like shape, and this is pressure-bonded to the current collector (dry method). Alternatively, the positive electrode active material, the binding material, and other materials such as a conducting material and a thickening agent which are used as necessary are dissolved or dispersed in a dispersing solvent to be a slurry, and this is applied to the current collector and then dried (wet method).

As the positive electrode active material, as mentioned above, the layered lithium nickel manganese cobalt composite oxide (NMC) and the spinel lithium manganese oxide (sp-Mn) are used. These are used in a powder (grain) state, and are mixed with each other.

To the surface of this positive electrode active material, a substance having a different composition from the substance constituting the positive electrode active material to be the main constituent may be adhered. Examples of the surface adherence substances include oxides such as aluminum oxide, silicon oxide, titanium oxide, zirconium dioxide, magnesium oxide, calcium oxide, boron oxide, antimony oxide, and bismuth oxide, sulfates such as lithium sulfate, sodium sulfate, potassium sulfate, magnesium sulfate, calcium sulfate, and aluminum sulfate, carbonates such as lithium carbonate, calcium carbonate, and magnesium carbonate, and carbon.

As the particles of the positive electrode active materials of the layered lithium nickel manganese cobalt composite oxide (NMC) and the spinel lithium manganese oxide (sp-Mn), those in a massive form, a polyhedron shape, a spherical shape, an oval sphere shape, a tabular shape, a needle shape, a pillar shape and the like may be used.

Among them, those having primary particles which are condensed to form a secondary particle, the shape of the secondary particle being a spherical shape or an oval sphere shape, are preferred.

In an electrochemical device like a battery, an active material in an electrode swells and contracts in association with the charging and discharging thereof, and therefore, deteriorations such as destruction of the active material and disconnection of a conducting path due to the stress thereof tend to occur. Therefore, those having primary particles which are condensed to form a secondary particle are preferably used compared with those of a single particle having only primary particles because the stress of the swelling and contraction can be eased and the above-mentioned deteriorations can be prevented. Also, particles of spherical shape or oval sphere shape are preferably used compared with particles having axial orientation such as the tabular shape because the orientation in the electrode decreases and the swelling and contraction of the electrode at the time of charging and discharging are reduced. Furthermore, such particles are preferred because they are uniformly mixed with other materials such as a conducting material at the time of forming the electrode.

Regarding a median diameter d50 of particles of the positive electrode active materials of the layered lithium nickel manganese cobalt composite oxide (NMC) and the spinel lithium manganese oxide (sp-Mn) (the median diameter d50 of the secondary particle in the case where primary particles are condensed to form the secondary particle), the ranges thereof can be adjusted as follows. That is, the lower limit of the range is 1 μm or more, preferably 3 μm or more, and more preferably 5 μm or more, and the upper limit is 30 μm or less, preferably 25 μm or less, and more preferably 15 μm or less. In a range less than the above-mentioned lower limit, there is fear that a tap density (filling characteristics) is lowered and a desired tap density may be no longer acquired, and in a range exceeding the above-mentioned upper limit, the deterioration of the battery performance may be caused because spread of lithium ions in particles takes time. Furthermore, in the case of exceeding the above-mentioned upper limit, mixing characteristics with other materials such as a binding material and a conducting material may be lowered at the time of forming the electrode. Therefore, when this mixture is slurried and then applied, the mixture cannot be uniformly applied and unevenness like stripes may be formed. Note that the median diameter d50 can be calculated from a particle size distribution obtained by a laser diffraction and scattering method.

In the case where the primary particles are condensed to form the secondary particle, the ranges of an average particle diameter of the primary particle are as follows. That is, the lower limit of the range is 0.01 µm or more, preferably 0.05 µm or more, more preferably 0.08 µm or more, and still more preferably 0.1 µm or more, and the upper limit is 3 µm or less, preferably 2 µm or less, more preferably 1 µm or less, and still more preferably 0.6 µm or less. In the case of exceeding the above-mentioned upper limit, the formation of the secondary particle in a spherical shape becomes difficult, and battery performances such as output characteristics may be deteriorated due to the deterioration of the tap density (filling characteristics) and the deterioration of a specific surface area. In addition, in the range less than the above-mentioned lower limit, the reversibility of charging and discharging may be deteriorated due to the decrease in crystallinity.

The ranges of a BET specific surface area of particles of the positive electrode active materials of the layered lithium nickel manganese cobalt composite oxide (NMC) and the spinel lithium manganese oxide (sp-Mn) are as follows. That is, the lower limit of the range is 0.2 m$^2$/g or more, preferably 0.3 m$^2$/g or more, and more preferably 0.4 m$^2$/g or more, and the upper limit is 4.0 m$^2$/g or less, preferably 2.5 m$^2$/g or less, and more preferably 1.5 m$^2$/g or less. In the range less than the above-mentioned lower limit, the battery performance may be deteriorated. In the case of exceeding the above-mentioned upper limit, it becomes difficult to increase the tap density, and mixing characteristics with other materials such as a binding material and a conducting material may be lowered. Therefore, application characteristics in the case where this mixture is slurried and then applied may be deteriorated. The BET specific surface area is a specific surface area (area per unit gram) obtained by a BET method.

Conducting materials for the positive electrode include, for example, metal materials such as copper and nickel, graphites such as natural graphite and artificial graphite, carbon black such as acetylene black, and carbonaceous materials like amorphous carbon such as needle coke. Note that one material among these may be used independently, or two or more materials may be used in combination.

The ranges of the contained amount (additive amount, percentage, quantity) of the conducting material relative to a mass of the positive electrode composite are as follows. That is, the lower limit of the range is 0.01 mass % or more, preferably 0.1 mass % or more, and more preferably 1 mass % or more, and the upper limit is 50 mass % or less, preferably 30 mass % or less, and more preferably 15 mass % or less. In the range less than the above-mentioned lower limit, conductivity may become insufficient. In addition, in the case of exceeding the above-mentioned upper limit, the battery capacity may be lowered.

The binding material of the positive electrode active material is not particularly limited, and a material whose solubility and dispersibility for a dispersing solvent are suitable is selected in the case where the positive electrode composite is formed by an application method. Specific examples thereof include: resin-based polymers such as polyethylene, polypropylene, polyethylene terephthalate, polymethyl methacrylate, polyimide, aromatic polyamide, cellulose, and nitrocellulose; rubber-like polymers such as SBR (styrene-butadiene rubber), NBR (acrylonitrile-butadiene rubber), fluoro-rubber, isoprene rubber, butadiene rubber, and ethylene-propylene rubber; thermoplastic elastomer polymers such as styrene butadiene styrene block co-polymer or its hydrogen additive, EPDM (ethylene propylene diene terpolymer), styrene ethylene butadiene ethylene co-polymer, and styrene isoprene styrene block co-polymer or its hydrogen additive; soft resin polymers such as syndiotactic-1,2-polybutadiene, polyvinyl acetate, ethylene-vinyl acetate co-polymer, and propylene α-olefin co-polymer; fluorine-based polymers such as a polyvinylidene fluoride (PVdF), polytetrafluoroethylene, fluorinated polyvinylidene fluoride, polytetrafluoroethylene ethylene co-polymer, and polytetrafluoroethylene vinylidene fluoride co-polymer; and polymer compositions having the ion conductivity of an alkali metal ion (in particular, lithium ion). Note that one material among these may be used independently, or two or more materials may be used in combination. From a viewpoint of stability of the positive electrode, it is preferred to use fluorine-based polymers such as polyvinylidene fluoride (PVdF) and polytetrafluoroethylene vinylidene fluoride co-polymer.

The ranges of the contained amount (additive amount, percentage, quantity) of the binding material relative to a mass of the positive electrode composite are as follows. That is, the lower limit of the range is 0.1 mass % or more, preferably 1 mass % or more, and more preferably 3 mass % or more, and the upper limit is 80 mass % or less, preferably 60 mass % or less, more preferably 40 mass % or less, and still more preferably 10 mass % or less. When the contained amount of the binding material is too low, the positive electrode active material cannot be fully bound and a mechanical strength of the positive electrode becomes insufficient, with the result that battery performances such as cycle characteristics may be deteriorated. Conversely, when too high, the battery capacity and conductivity may be lowered.

The layer formed on the current collector by using the above-mentioned wet method or dry method is preferably consolidated with a hand press, a roller press and the like in order to enhance a filling density of the positive electrode active material.

The positive electrode composite density is preferably 2.4 to 2.7 g/cm$^3$.

In the case where the positive electrode composite density is less than 2.4 g/cm$^3$, a resistance of the positive electrode may be increased and input/output characteristics may be deteriorated. On the other hand, when the positive electrode composite density exceeds 2.7 g/cm$^3$, there is a concern about the safety deterioration, and enhancement of other safety measures may be needed. From such a viewpoint, the positive electrode composite density is more preferably 2.45 g/cm$^3$ or more and 2.6 g/cm$^3$ or less.

The application quantity of the positive electrode composite to one surface of the positive electrode current collector is preferably 175 to 250 g/m$^2$.

In the case where the positive electrode composite application quantity is less than 175 g/m$^2$, the amount of the active material which contributes to charging and discharging may be decreased and an energy density of the battery may be lowered. On the other hand, when the positive electrode composite application quantity exceeds 250 g/m$^2$, a resistance of the positive electrode composite may be increased and input/output characteristics may be deteriorated. From the above viewpoint, the application quantity of the positive electrode composite to one surface of the positive electrode current collector is preferably 180 g/m$^2$ or more and 230 g/m$^2$ or less, and more preferably 185 g/m$^2$ or more and 220 g/m$^2$ or less.

In light of the application quantity of the positive electrode composite to one surface of the positive electrode current collector and the positive electrode composite density as described above, the application film thickness of the positive electrode composite to one surface of the positive electrode current collector ([thickness of positive electrode−thickness of positive electrode current collector]/2) is preferably 60 to 100 µm, more preferably 65 to 95 µm, and still more preferably 70 to 90 µm.

As described above, regarding the positive electrode composite, the positive electrode composite density, the positive electrode composite application quantity, and the mass ratio (NMC/sp-Mn) of the active materials are set within the ranges mentioned above. By this means, even in the lithium ion battery having a large capacity, that is, a discharge capacity of 30 Ah or more and less than 99 Ah, a high-input and high-output battery having a high energy density can be realized, while guaranteeing the safety.

The material of the current collector for the positive electrode is not particularly limited, and specific examples thereof include: metal materials such as aluminum, stainless steel, plated nickel, titanium, tantalum; and carbonaceous materials such as carbon cloth and carbon paper. Among them, the metal material, especially aluminum, is preferred.

The shape of the current collector is not particularly limited, and any materials processed into various shapes can be used. Specific examples thereof include: regarding metal materials, metal foil, metal column, metal coil, metal plate, metal thin film, expanded metal, punched metal, and foamed metal; and regarding carbonaceous materials, carbon plate, carbon thin film, and carbon cylindrical column. Among them, the metal thin film is preferably used. Note that the thin film may be formed into a mesh-like shape as appropriate. The thickness of the thin film is arbitrary, and the ranges thereof are as follows. That is, the lower limit of the range is 1 µm or more, preferably 3 µm or more, and more preferably 5 µm or more, and the upper limit is 1 mm or less, preferably 100 µm or less, and more preferably 50 µm or less. In the range less than the above-mentioned lower limit, sufficient strength required for the current collector cannot be obtained in some cases. In addition, in the case of exceeding the above-mentioned upper limit, plasticity may be lowered and processability may be deteriorated.

2. Negative Electrode

In the present embodiment, a negative electrode described below is provided as a negative electrode applicable to the high-output lithium ion battery having a large capacity. The negative electrode (negative electrode plate) of the present embodiment is made up of a current collector and a negative electrode composite (negative electrode mixture) formed on both surfaces (or one surface) of the current collector. The negative electrode composite contains a negative electrode active material which can electrochemically occlude and release lithium ions.

The negative electrode in the present embodiment has a state of charge of 60% or more at a potential to be 0.1 V with respect to a lithium potential. Here, the state of charge may be referred to as SOC. From a viewpoint of charge load characteristics, SOC at a potential to be 0.1 V with respect to a lithium potential is preferably 65% or more, and more preferably 68% or more. As described above, as SOC at a potential to be 0.1 V with respect to a lithium potential is higher, the battery is less likely to be affected by IR drop (voltage drop) in the positive electrode, and the charge load characteristics are enhanced.

There is no upper limit of SOC of the negative electrode at a potential to be 0.1 V with respect to a lithium potential, but it is preferably 90% or less, and more preferably 80% or less from a practical viewpoint. Examples of the negative electrode active material which exhibits such a function include easily graphitizable carbon.

The easily graphitizable carbon has an interlayer spacing (d002) of carbon in a wide-angle X-ray diffraction method of preferably 0.34 nm or more and less than 0.36 nm, more preferably 0.341 nm or more and 0.355 nm or less, and still more preferably 0.342 nm or more and 0.35 nm or less.

Further, the average particle diameter (50% D) of the easily graphitizable carbon is preferably 2.0 to 50 µm. When the average particle diameter is 5 µm or more, the specific surface area can be fallen within an appropriate range, and an initial charge/discharge efficiency of a lithium ion battery is excellent. At the same time, the contact between particles is good and the input/output characteristics tend to be excellent. Meanwhile, when the average particle diameter is 30 µm or less, irregularities are less likely to be formed on an electrode surface, and short circuit of a battery can be suppressed. In addition, since the diffusion distance of Li from a particle surface to inside thereof is relatively short, the input/output characteristics of the lithium ion battery tend to be enhanced. In view of this, the average particle diameter is preferably 5 to 30 µm, and more preferably 10 to 20 µm. For example, the particle size distribution can be measured by dispersing a sample into purified water containing surfactant by use of a laser diffraction particle size distribution measurement device (for example, SALD-3000) manufactured by Shimadzu Corporation), and the average particle diameter is calculated as 50% D.

In addition, the easily graphitizable carbon preferably contains graphite as the negative electrode active material. The graphite preferably has physical properties shown in the following (1) and (2).

(1) An R value that is an intensity ratio (ID/IG) between peak intensity (ID) in the range of 1300 to 1400 cm$^{-1}$ measured by a Raman spectroscopy spectrum and peak intensity (IG) in the range of 1580 to 1620 cm$^{-1}$ measured by a Raman spectroscopy spectrum is preferably 3 or more, more preferably 10 or more, and still more preferably 50 or more.

(2) An average particle diameter (50% D) is preferably 2 µm to 20 µm, and more preferably 3 µm to 10 µm. In the case of 20 µm or less, a discharge capacity and discharge load characteristics are enhanced. In the case of 2 µm or more, an initial charge/discharge efficiency tends to be enhanced.

Note that a volume average particle diameter can be measured by, for example, a particle size distribution measurement device (for example, SALD-3000 manufactured by Shimadzu Corporation) using a laser light scattering method.

Since a pulverized product obtained by pulverizing massive natural graphite may contain impurities, it is preferred to increase the purity of the pulverized product by a refining treatment. The purity of the natural graphite is preferably 99.8% or more (ash: 0.2% or less) in mass standard, and more preferably 99.9% or more (ash: 0.1% or less). In the case where the purity is 99.8% or more, the safety of the battery is further enhanced, and the battery performance is further enhanced.

The method of the refining treatment is not particularly limited, and it can be suitably selected from ordinary refining treatment methods. Examples thereof include ore floatation, an electrochemistry treatment, and a chemical treatment. By mixing easily graphitizable carbon (a) with graphite (b), output characteristics and an energy density can be further enhanced while maintaining the input characteristics. In the case where graphite is contained, the content ratio ((a)/(b)) of easily graphitizable carbon and graphite is preferably 99/1 to 50/50, more preferably 99/3 to 70/30, and still more preferably 95/5 to 80/20. In the case where the blending ratio of graphite is 1% or more, output characteristics are enhanced, and in the case where the blending ratio of graphite is 50% or less, input characteristics can be maintained.

In addition, as the negative electrode active material, carbonaceous materials other than easily graphitizable carbon and graphite, metal oxides such as tin oxide and silicon oxide, metal composite oxides, lithium single substance, lithium alloy such as lithium aluminum alloy, and materials such as Sn and Si which can form alloy with lithium, and the like may be used in combination. One material among these may be used independently, or two or more materials may be used in combination. The metal composite oxide is not particularly limited as long as it can occlude and release lithium, and the oxide containing Ti (titanium) or Li (lithium) or both Ti and Li is preferred from a viewpoint of high current density charging/discharging characteristics.

Examples of the carbonaceous materials other than the easily graphitizable carbon (a) include non-graphitizable carbon, natural graphite, composite carbonaceous materials obtained by forming a film formed on natural graphite by a dry CVD (Chemical Vapor Deposition) method or a wet spray method, and artificial graphite obtained by sintering a resin material such as epoxy or phenol or a pitch-based material obtained from petroleum or coal.

In addition, it is also possible to use lithium metal which becomes capable of occluding and releasing lithium by forming compound with lithium and oxide or nitride of elements of the fourth group such as silicon, germanium and tin which becomes capable of occluding and releasing lithium by forming compound with lithium and then being inserted in the crystal gap.

As a preferred configuration, there is a configuration in which a carbonaceous material whose particle size distribution on a volumetric basis is not bilaterally symmetrical about the median diameter serving as center is used as the third carbonaceous material (conducting material). Alternatively, there are a configuration in which a carbonaceous material whose Raman R value differs from that of the carbonaceous material used as the negative electrode active material is used as the second carbonaceous material (conducting material), and a configuration in which a carbonaceous material whose X-ray parameter differs from that of the first carbonaceous material used as the negative electrode active material is used as the third carbonaceous material (conducting material), and the like.

As the second carbonaceous material (conducting material), carbonaceous materials having high conductivity such as graphite, amorphous material, and activated carbon can be used. Specifically, graphites such as natural graphite and artificial graphite, carbon black such as acetylene black, and amorphous carbon such as needle coke can be used. One material among these may be used independently, or two or more materials may be used in combination. In this way, by adding the third carbonaceous material (conducting material), an effect such as the reduction of resistance of the electrode can be achieved.

Regarding the contained amount (additive amount, percentage, quantity) of the third carbonaceous material (conducting material), the ranges of the contained amount of the conducting material relative to a mass of the negative electrode composite are as follows. That is, the lower limit of the range is 1 mass % or more, preferably 2 mass % or more, and more preferably 3 mass % or more, and the upper limit is 45 mass % or less, and preferably 40 mass % or less. In the range less than the above-mentioned lower limit, effect of enhancing the conductivity is hard to be acquired, and in the case of exceeding the above-mentioned upper limit, an initial irreversible capacity may be increased.

The materials of the current collector for the negative electrode are not particularly limited, and specific examples thereof include metal materials such as copper, nickel, stainless steel, and nickel-plating steel. Among them, from a viewpoint of processability and cost, copper is preferred.

The shape of the current collector is not particularly limited, and materials processed into various shapes can be used. Specific examples thereof include metal foil, metal column, metal coil, metal plate, metal thin film, expanded metal, punched metal, and foamed metal. Among them, the metal thin film is preferred and the copper foil is more preferred. As the copper foil, there are a rolled copper foil formed by a rolling method and an electrolytic copper foil formed by an electrolytic method, and both are suitably used as the current collector.

Although the thickness of the current collector is not particularly limited, in the case where the thickness is less than 25 μm, the strength thereof can be enhanced by using strong copper alloy (phosphor bronze, copper-titanium alloy, Corson alloy, Cu—Cr—Zr alloy, and the like) instead of pure copper.

The configuration of the negative electrode composite formed by using the negative electrode active material is not particularly limited, and the ranges of the negative electrode composite density are as follows. That is, the lower limit of the negative electrode composite density is preferably 0.7 g/cm$^3$ or more, more preferably 0.8 g/cm$^3$ or more, and still more preferably 0.9 g/cm$^3$ or more, and the upper limit is 2 g/cm$^3$ or less, preferably 1.9 g/cm$^3$ or less, more preferably 1.8 g/cm$^3$ or less, and still more preferably 1.7 g/cm$^3$ or less.

In the case of exceeding the above-mentioned upper limit, particles of the negative electrode active material tend to be destroyed, which may cause the increase in an initial irreversible capacity and the deterioration of high current density charging/discharging characteristics due to reduction of permeability of nonaqueous electrolytic solution into the vicinity of an interface between the current collector and the negative electrode active material. Also, in the range less than the above-mentioned lower limit, a battery resistance may be increased because the conductivity between the negative electrode active materials is lowered, and the capacity per volume may be lowered.

The binding material of the negative electrode active material is not particularly limited as long as it is a material stable for the nonaqueous electrolytic solution and dispersing solvent used at the time of forming an electrode. Specific examples thereof include: resin-based polymers such as polyethylene, polypropylene, polyethylene terephthalate, polymethyl methacrylate, aromatic polyamide, cellulose, and nitrocellulose; rubber-like polymers such as SBR (styrene-butadiene rubber), isoprene rubber, butadiene rubber, fluoro-rubber, NBR (acrylonitrile-butadiene rubber), and ethylene-propylene rubber; styrene butadiene styrene block co-polymer or its hydrogen additive; thermoplastic elastomer polymers such as EPDM (ethylene propylene diene terpolymer), styrene ethylene butadiene styrene co-polymer, and styrene isoprene styrene block co-polymer or its hydrogen additive; soft resin polymers such syndiotactic-1,2-polybutadiene, polyvinyl acetate, ethylene-vinyl acetate co-polymer, and propylene α-olefin co-polymer; fluorine-based polymers such as polyvinylidene fluoride, polytetrafluoroethylene, fluorinated polyvinylidene fluoride, and polytetrafluoroethylene ethylenic co-polymer; and polymer compositions having an ion conductivity of alkali metal ion (in particular, lithium ion). One material among these may be used independently, or two or more materials may be used in combination.

The type of the dispersing solvent for forming the slurry is not limited as long as the solvent can dissolve or disperse the negative electrode active material, the binding material, and the conducting material and the thickening agent which are used as necessary, and both aqueous solvent and organic solvent may be used. Examples of the aqueous solvent include water, mixed solvent of alcohol and water, and others, and examples of the organic solvent include N-methyl pyrrolidone (NMP), dimethylformamide, dimethylacetamide, methyl ethyl ketone, cyclohexanone, methyl acetate, methyl acrylate, diethyltriamine, N,N-dimethylamino propylamine, tetrahydrofuran (THF), toluene, acetone, diethyl ether, dimethylacetamide, hexamethylphosphoramide, dimethyl sulfoxide, benzene, xylene, quinoline, pyridine, methylnaphthalene, hexane, and others. When using the aqueous solvent in particular, it is preferred to use a thickening agent. A dispersing agent and the like are added together with this thickening agent, and a slurry is produced by using a latex such as SBR. Note that one dispersing solvent among these may be used independently, or two or more dispersing solvents may be used in combination.

The ranges of the contained amount (additive amount, percentage, quantity) of the binding material relative to a mass of the negative electrode composite are as follows. That is, the lower limit of the range is preferably 0.1 mass % or more, more preferably 0.5 mass % or more, and still more preferably 0.6 mass % or more. The upper limit is 20 mass % or less, preferably 15 mass % or less, more preferably 10 mass % or less, and still more preferably 8 mass % or less.

In the case of exceeding the above-mentioned upper limit, a percentage of the binding material which does not contribute to the battery capacity may be increased, and the battery capacity may be lowered. In addition, in the range less than the above-mentioned lower limit, a strength of the negative electrode composite may be lowered.

In particular, the ranges of the contained amount of the binding material relative to a mass of the negative electrode composite in the case where the rubber-like polymer represented by SBR is used as a major component of the binding material are as follows. That is, the lower limit of the range is 0.1 mass % or more, preferably 0.5 mass % or more, and more preferably 0.6 mass % or more, and the upper limit is 5 mass % or less, preferably 3 mass % or less, and more preferably 2 mass % or less.

Also, the ranges of the contained amount of the binding material relative to a mass of the negative electrode composite in the case where the fluorine-based polymer represented by the polyvinylidene fluoride is used as a major component of the binding material are as follows. That is, the lower limit of the range is 1 mass % or more, preferably 2 mass % or more, and more preferably 3 mass % or more, and the upper limit is 15 mass % or less, preferably 10 mass % or less, and more preferably 8 mass % or less.

The thickening agent is used for adjusting the viscosity of the slurry. The thickening agent is not particularly limited, and specific examples thereof include carboxymethylcellulose, methylcellulose, hydroxymethylcellulose, ethylcellulose, polyvinyl alcohol, oxidized starch, phosphorylation starch, casein, salt thereof, and the like. One material among these may be used independently, or two or more materials may be used in combination.

The ranges of the contained amount of the thickening agent relative to a mass of the negative electrode composite in the case of using the thickening agent are as follows. That is, the lower limit of the range is 0.1 mass % or more, preferably 0.5 mass % or more, and more preferably 0.6 mass % or more, and the upper limit is 5 mass % or less, preferably 3 mass % or less, and more preferably 2 mass % or less.

In the range less than the above-mentioned lower limit, application properties of the slurry may be lowered. Also, in the case of exceeding the above-mentioned upper limit, a percentage of the negative electrode active material to the negative electrode composite is reduced, and the battery capacity may be lowered and the resistance between negative electrode active materials may be increased.

3. Electrolytic Solution

The electrolytic solution of the present embodiment is composed of lithium salt (electrolyte) and nonaqueous solvent which dissolves the lithium salt. As necessary, additives may be added.

The lithium salt is not particularly limited as long as it can be used as an electrolyte of nonaqueous electrolytic solution for lithium ion batteries, and examples thereof include inorganic lithium salt, fluorine-containing organic lithium salt, and oxalatoborate salt shown below.

Examples of the inorganic lithium salt include inorganic fluoride salts such as $LiPF_6$, $LiBF_4$, $LiAsF_6$, and $LiSbF_6$, perhalogen acid salts such as $LiClO_4$, $LiBrO_4$, and $LiIO_4$, and inorganic chloride salt such as $LiAlCl_4$.

Examples of the fluorine-containing organic lithium salt include: perfluoroalkane sulfonate such as $LiCF_3SO_3$; perfluoroalkane sulfonylimide salts such as $LiN(CF_3SO_2)_2$, $LiN(CF_3CF_2SO_2)_2$, and $LiN(CF_3SO_2)(C_4F_9SO_2)$; perfluoroalkane sulfonylmethide salt such as $LiC(CF_3SO_2)_3$; fluoroalkyl fluorophosphates salts such as $Li[PF_5(CF_2CF_2CF_3)]$, $Li[PF_4(CF_2CF_2CF_3)_2]$, $Li[PF_3(CF_2CF_2CF_3)_3]$, , $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$; and others.

Examples of the oxalatoborate salt include lithium bis(oxalato)borate, lithium difluoro oxalatoborate, and others.

One lithium salt among these may be used independently, or two or more lithium salts may be used in combination. Among them, lithium hexafluorophosphate ($LiPF_6$) is preferred when solubility for solvent, charging/discharging characteristics for use as a secondary battery, output characteristics, cycle characteristics, and others are comprehensively considered.

A preferred example of using two or more kinds of lithium salts is the combined use of $LiPF_6$ and $LiBF_4$. In this case, a percentage of $LiBF_4$ to the sum total of both is preferably 0.01 mass % or more and 20 mass % or less, and more preferably 0.1 mass % or more and 5 mass % or less. Also, another preferred example is the combined use of inorganic fluoride salt and perfluoroalkane sulfonylimide salt, and in this case, a percentage of the inorganic fluoride salt to the sum total of both is preferably 70 mass % or more and 99 mass % or less, and more preferably 80 mass % or more and 98 mass % or less. According to the two preferred examples mentioned above, characteristic deterioration due to high temperature preservation can be suppressed.

The concentration of electrolyte in the nonaqueous electrolytic solution is not particularly limited, and the ranges of the concentration of electrolyte are as follows. That is, the lower limit of the concentration is 0.5 mol/L or more, preferably 0.6 mol/L or more, and more preferably 0.7 mol/L or more. Also, the upper limit of the concentration is 2 mol/L or less, preferably 1.8 mol/L or less, and more preferably 1.7 mol/L or less. When the concentration is too low, an electric conductivity of the electrolytic solution may become insufficient. Also, when the concentration is too high, the electric conductivity may be lowered because the viscosity is increased. The performance of the lithium ion battery may be lowered due to the deterioration of the electric conductivity like this.

The nonaqueous solvent is not particularly limited as long as it is nonaqueous solvent which can be used as the solvent of electrolyte for lithium ion batteries, and examples thereof include cyclic carbonate, chain carbonate, chain ester, cyclic ether, and chain ether described below.

As the cyclic carbonate, cyclic carbonate whose carbon number of an alkylene group constituting the cyclic carbonate is 2 to 6 is preferred, and cyclic carbonate whose carbon number thereof is 2 to 4 is more preferred. Specific examples thereof include ethylene carbonate, propylene carbonate, butylene carbonate, and others. Among them, ethylene carbonate and propylene carbonate are preferred.

As the chain carbonate, dialkyl carbonate is preferred, and chain carbonate whose carbon numbers of two alkyl groups are respectively 1 to 5 is preferred, and chain carbonate whose carbon numbers thereof are 1 to 4 is more preferred. Specific examples thereof include symmetric chain carbonates such as dimethyl carbonate, diethyl carbonate, and di-n-propyl carbonate; asymmetric chain carbonates such as ethyl methyl carbonate, methyl-n-propyl carbonate, and ethyl-n-propyl carbonate; and others. Among them, dimethyl carbonate, diethyl carbonate, and ethyl methyl carbonate are preferred.

Examples of chain esters include methyl acetate, ethyl acetate, propyl acetate, methyl propionate, and others. Among them, it is preferred to use the methyl acetate from a viewpoint of the improvement in low-temperature characteristics.

Examples of cyclic ether include tetrahydrofuran, 2-methyl tetrahydrofuran, tetrahydropyran, and others. Among them, it is preferred to use tetrahydrofuran from a viewpoint of the improvement in input/output characteristics.

Examples of chain ether include dimethoxyethane, dimethoxymethane, and others.

One material of these may be independently used and two or more materials may be used in combination, but it is preferred to use a mixed solvent in which two or more kinds of compounds are used together. For example, it is preferred to use high dielectric constant solvent of cyclic carbonates and low viscosity solvent such as chain carbonates and chain esters together. One of preferred combinations is the combination using cyclic carbonates and chain carbonates as main constituents. Among them, the combination in which the sum total of the cyclic carbonates and the chain carbonates to the nonaqueous solvent is 80 vol. % or more, preferably 85 vol. % or more, and more preferably 90 vol. % or more, and the volume of the cyclic carbonates to the sum total of the cyclic carbonates and the chain carbonates is within the following ranges is preferred. The lower limit of a volume of the cyclic carbonates is 5 vol. % or more, preferably 10 vol. % or more, and more preferably 15 vol. % or more, and the upper limit is 50 vol. % or less, preferably 35 vol. % or less, and more preferably 30 vol. % or less. By using the combination of nonaqueous solvents like this, cycle characteristics and high temperature preservation characteristics of the battery (in particular, remaining capacity after high temperature preservation and a high-load-discharging capacity) are enhanced.

Specific examples of the preferred combinations of the cyclic carbonates and the chain carbonates include: ethylene carbonate and dimethyl carbonate; ethylene carbonate and diethyl carbonate; ethylene carbonate and ethyl methyl carbonate; ethylene carbonate, dimethyl carbonate and diethyl carbonate; ethylene carbonate, dimethyl carbonate and ethyl methyl carbonate; ethylene carbonate, diethyl carbonate and ethyl methyl carbonate; ethylene carbonate, dimethyl carbonate, diethyl carbonate and ethyl methyl carbonate; and others.

The additive is not particularly limited as long as it is the additive for the nonaqueous electrolytic solution of the lithium ion battery, and examples thereof include heterocyclic compound containing nitrogen, sulfur, or nitrogen and sulfur, cyclic carboxylic acid ester, fluorine-containing cyclic carbonate, and other compounds having unsaturated bonding within a molecule.

The heterocyclic compound containing nitrogen, sulfur, or nitrogen and sulfur is not particularly limited, and examples thereof include: pyrrolidinones such as 1-methyl-2-pyrrolidinone, 1,3-dimethyl-2-pyrrolidinone, 1,5-dimethyl-2-pyrrolidinone, 1-ethyl-2-pyrrolidinone, and 1-cyclohexyl-2-pyrrolidinone; oxazolidinones such as 3-methyl-2-oxazolidinone, 3-ethyl-2-oxazolidinone, and 3-cyclohexyl-2-oxazolidinone; piperidones such as 1-methyl-2-piperidone and 1-ethyl-2-piperidone; imidazolidinones such as 1,3-dimethyl-2-imidazolidinone and 1,3-diethyl-2-imidazolidinone; sulfolanes such as sulfolane, 2-methyl sulfolane, and 3-methyl sulfolane; sulfolene; sulfites such as ethylene sulfite and propylene sulfite; and sultones such as 1,3-propane sultone, 1-methyl-1,3-propane sultone, 3-methyl-1, 3-propane sultone, 1,4-butane sultone, 1,3-propene sultone, and 1,4-butene sultone; and others. Among them, 1-methyl-2-pyrrolidinone, 1-methyl-2-piperidone, 1,3-propane sultone, 1,4-butane sultone, 1,3-propene sultone, and 1,4-butene sultone and others are particularly preferred from a viewpoint of the extension of the battery life.

The cyclic carboxylic acid ester is not particularly limited, and examples thereof include γ-butyrolactone, γ-valerolactone, γ-hexalactone, γ-heptalactone, γ-octalactone, γ-nonalactone, γ-decalactone, γ-undecalactone, γ-dodecalactone, α-methyl-γ-butyrolactone, α-ethyl-γ-butyrolactone, α-propyl-γ-butyrolactone, α-methyl-γ-valerolactone, α-ethyl-γ-valerolactone, α,α-dimethyl-γ-butyrolactone, α,α-dimethyl-γ-valerolactone, δ-valerolactone, δ-hexalactone, δ-octalactone, δ-nonalactone, δ-decalactone, δ-undecalactone, δ-dodecalactone, and others. Among them, γ-butyrolactone, γ-valerolactone and the like are particularly preferred from a viewpoint of the extension of the battery life.

The fluorine-containing cyclic carbonate is not particularly limited, and examples thereof include fluoroethylene carbonate, difluoroethylene carbonate, trifluoroethylene carbonate, tetrafluoroethylene carbonate, trifluoropropylene carbonate, and others. Among them, fluoroethylene carbonate and the like is particularly preferred from a viewpoint of the extension of the battery life.

Examples of other compounds having unsaturated bonding within a molecule include: carbonates such as vinylene carbonate, vinylethylene carbonate, divinylethylene carbonate, methylvinyl carbonate, ethylvinyl carbonate, propylvinyl carbonate, divinyl carbonate, allylmethyl carbonate, allylethyl carbonate, allylpropyl carbonate, diarylcarbonate, and dimethallyl carbonate; esters such as vinyl acetate, vinyl propionate, vinyl acrylate, vinyl crotonate, vinyl methacrylate, allyl acetate, allyl propionate, methyl acrylate, ethyl acrylate, propyl acrylate, methyl methacrylate, ethyl methacrylate, and propyl methacrylate; sulfones such as divinyl sulfone, methylvinyl sulfone, ethylvinyl sulfone, propylvinyl sulfone, diaryl sulfone, allylmethyl sulfone, allylethyl sulfone, and allylpropyl sulfone; sulfites such as divinyl sulfite, methylvinyl sulfite, ethylvinyl sulfite, and diaryl sulfite; sulfonates such as vinylmethane sulfonate, vinylethane sulfonate, allylmethane sulfonate, allylethane sulfonate, methylvinyl sulfonate, and ethylvinyl sulfonate; sulfates such as divinyl sulfate, methylvinyl sulfate, ethylvinyl sulfate, and diaryl sulfate; and others. Among them, vinylene carbonate, dimethallyl carbonate, vinyl ethylene carbonate, divinyl ethylene carbonate, vinyl acetate, vinyl propionate, vinyl acrylate, divinyl sulfone, vinylmethane sulfonate, and others are particularly preferred from a viewpoint of the extension of the battery life.

Other than the above-mentioned additives, additives such as an overcharging prevention material, a negative electrode coating material, a positive electrode protection material, a high input/output material may be used in accordance with desired functions.

Examples of the overcharging prevention material include: aromatic compounds such as biphenyl, alkyl biphenyl, terphenyl, partially hydrogenated terphenyl, cyclohexylbenzene, t-butylbenzene, t-amylbenzene, diphenyl ether, and dibenzofuran; partially fluorinated compounds of the above-mentioned aromatic compounds such as 2-fluorobiphenyl, o-cyclohexyl fluorobenzene, and p-cyclohexyl fluorobenzene; fluorine-containing anisole compounds such as 2,4-difluoro anisole, 2,5-difluoro anisole, 2,6-difluoro anisole, and 3,5-difluoro anisole; and others. Among them, aromatic compounds such as biphenyl, alkyl biphenyl, terphenyl, partially hydrogenated terphenyl, cyclohexylbenzene, t-butylbenzene, t-amylbenzene, diphenyl ether, and dibenzofuran are preferred. Two or more kinds of these overcharging prevention materials may be used together. When two or more kinds are used together, it is particularly preferred to use cyclohexylbenzene or terphenyl (or partially hydrogenated compound thereof) together with t-butylbenzene or t-amylbenzene.

Examples of the negative electrode coating material include succinic anhydride, glutaric anhydride, maleic anhydride, citraconic anhydride, glutaconic anhydride, itaconic anhydride, cyclohexanedicarboxylic anhydride, and others. Among them, succinic anhydride and maleic anhydride are preferred. Two or more kinds of these negative electrode coating materials may be used together.

Examples of the positive electrode protection material include dimethyl sulfoxide, diethyl sulfoxide, dimethyl sulfite, diethyl sulfite, methyl methanesulfonate, busulfan, toluenesulfonic acid methyl, dimethyl sulfate, diethyl sulfate, dimethyl sulfone, diethyl sulfone, diphenylsulfide, thioanisole, diphenyl disulfide, and others. Among them, methyl methanesulfonate, busulfan, and dimethyl sulfone are preferred. Two or more kinds of these positive electrode protection materials may be used together.

Examples of the high input/output material include: ammonium salt, potassium salt, or lithium salt of perfluoroalkyl sulfonate and perfluoroalkyl carboxylate; surface active agents such as perfluoroalkyl polyoxyethylene ether and fluorinated alkyl ester; and others. Among them, perfluoroalkyl polyoxyethylene ether and fluorinated alkyl ester are preferred.

The percentage of the additives in the nonaqueous electrolytic solution is not particularly limited, and the ranges thereof are as follows. Note that, in the case of using a plurality of additives, they indicate the percentages of respective additives. That is, the lower limit of the percentage of the additive to the nonaqueous electrolytic solution is preferably 0.01 mass % or more, more preferably 0.1 mass % or more, and still more preferably 0.2 mass % or more, and the upper limit is preferably 5 mass % or less, more preferably 3 mass % or less, and still more preferably 2 mass % or less.

By means of the above-mentioned other additives, for example, it is possible to suppress an abrupt electrode reaction in an abnormal state due to overcharging, enhance the capacity maintenance characteristics and cycle characteristics after high temperature preservation, and enhance the input/output characteristics.

4. Separator

The separator is not particularly limited as long as it has ionic permeability while electronically insulating the positive electrode and the negative electrode, and is provided with resistance against oxidization on the positive electrode side and reduction on the negative electrode side. As materials (substances) for the separator which satisfy the characteristics mentioned above, for example, resin, inorganic substance, and glass fiber are used.

As the resin, olefin-based polymer, fluorine-based polymer, cellulose-based polymer, polyimide, nylon, and others are used. Specifically, it is preferred to select from materials which are stable for the nonaqueous electrolytic solution and excellent in solution retention, and porous sheet, nonwoven fabric and the like using polyolefin such as polyethylene or polypropylene as a raw material is preferably used.

As the inorganic substance, oxides such as alumina and silicon dioxide, nitrides such as aluminum nitride and silicon nitride, sulfates such as barium sulfate and calcium sulfate, and others are used. For example, it is possible to use the separator obtained by adhering the above-mentioned inorganic substance in fiber shape or particle shape to a base material in a thin film shape such as nonwoven fabric, woven fabric, and fine porous film. As the base material in a thin film shape, a material whose pore diameter is 0.01 to 1 μm and thickness is 5 to 50 μm is suitably used. Also, for example, the material which is made of the above-mentioned inorganic substance in the fiber shape or particle shape and formed into a composite porous layer by using a binding material such as resin can be used as the separator. Furthermore, it is also possible to use the separator obtained by forming this composite porous layer on the surface of the positive electrode or the negative electrode. For example, a composite porous layer obtained by binding alumina particles whose 90% particle size is less than 1 μm with using fluororesin as a binding material may be formed on the surface of the positive electrode.

5. Other Constituent Parts

A cleavage valve may be provided as one of other constituent parts of the lithium ion battery. By opening the cleavage valve, a pressure rise inside the battery can be suppressed, and safety can be enhanced.

Also, a component part which discharges an inert gas (for example, carbon dioxide) in association with temperature increase may be provided. By providing the component part like this, it becomes possible to promptly open the cleavage valve by the generation of the inert gas when a temperature inside the battery is increased, and the safety can be enhanced. Examples of the material used for the above-mentioned component part include lithium carbonate, polyalkylene carbonate resin, and others. Examples of polyalkylene carbonate resin include polyethylene carbonate, polypropylene carbonate, poly(1,2-dimethyl ethylene carbonate), polybutene carbonate, polyisobutene carbonate, polypentene carbonate, polyhexene carbonate, polycyclopentene carbonate, polycyclohexene carbonate, polycyclohepten carbonate, polycyclooctane carbonate, polylimonene carbonate, and others. As the materials used for the above-mentioned component part, lithium carbonate, polyethylene carbonate, and polypropylene carbonate are preferred.

(Lithium Ion Battery)

First, an embodiment in which the present invention is applied to a laminated battery will be described. A laminated lithium ion battery can be fabricated, for example, as follows. First, a positive electrode and a negative electrode are cut into multangular shapes, and a tab is welded to each electrode to prepare a positive and negative electrode terminals. A positive electrode, an insulation layer, and a negative electrode are layered in this order to produce a laminated body. This laminated body is then placed as it is in a laminate package made of aluminum, and the laminate package is closed tightly while the positive and negative electrode terminals are extended outward from the aluminum laminate package. Next, nonaqueous electrolyte is injected into the aluminum laminate package and an opening of the aluminum laminate package is closed tightly, thereby obtaining a lithium ion battery.

Figure 1:
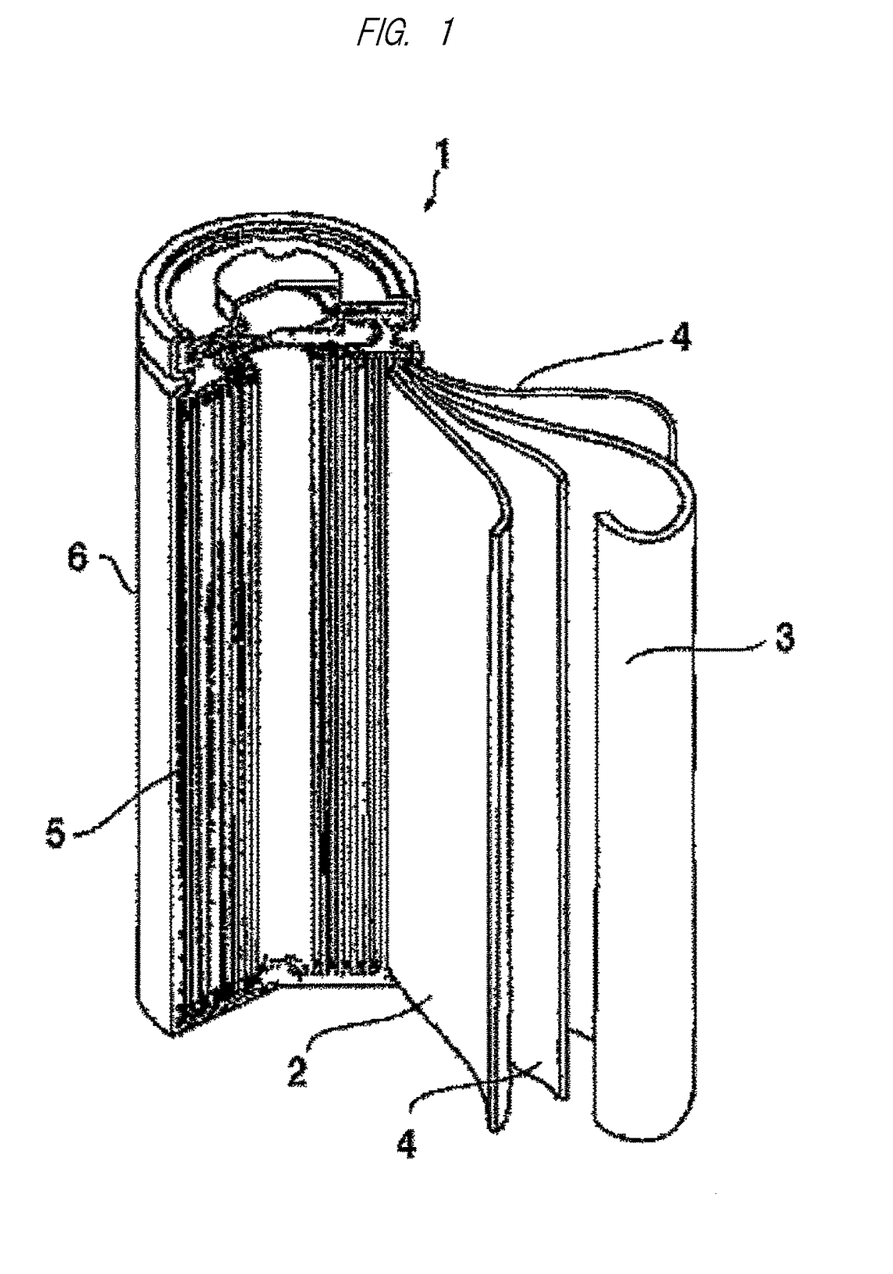
FIG. 1 is a sectional view of a cylindrical lithium ion battery of an embodiment to which the present invention can be applied.

Next, an embodiment in which the present invention is applied to a 18650 cylindrical lithium ion battery will be described with reference to a drawing.

As shown in FIG. 1, a lithium ion battery 1 of the present embodiment has a closed-bottom cylindrical battery container 6 made of nickel plated steel. The battery container 6 accommodates an electrode group 5 in which a positive electrode plate 2 and a negative electrode plate 3 in a belt-like shape are wound with a separator 4 interposed therebetween so as to have a spiral cross section. In the electrode group 5, the positive electrode plate 2 and the negative electrode plate 3 are wound with the separator 4, which is a porous sheet made of polyethylene, interposed therebetween so as to have a spiral cross section. For example, the separator 4 is configured to have a width of 58 mm and a thickness of 30 μm. A ribbon-shaped positive electrode tab terminal made of aluminum whose one end is fixed to the positive electrode plate 2 protrudes from an upper end surface of the electrode group 5. The other end of the positive electrode tab terminal is fixed by ultrasonic welding to a lower surface of a disk-shaped battery cover, which is disposed on an upper side of the electrode group 5 and functions as a positive electrode external terminal. Meanwhile, a ribbon-shaped negative electrode tab terminal made of copper whose one end is fixed to the negative electrode plate 3 protrudes from a lower end surface of the electrode group 5. The other end of the negative electrode tab terminal is fixed by resistance welding to an internal bottom of the battery container 6. Therefore, the positive electrode tab terminal and the negative electrode tab terminal protrude on mutually opposite sides from the respective end surfaces of the electrode group 5. Note that an insulation coating (not shown) is provided around the entire outer circumference of the electrode group 5. The battery cover is caulked and fixed to an upper part of the battery container 6 via an insulation gasket made of resin. Therefore, the inside of the lithium ion battery 1 is sealed. In addition, nonaqueous electrolytic solution (not shown) is injected into the battery container 6.

In the present invention, the capacity ratio of the positive electrode and the negative electrode (negative electrode capacity/positive electrode capacity) is 1 or more and less than 1.2, more preferably 1.03 to 1.18, and still more preferably 1.05 to 1.15 from a viewpoint of safety and an energy density. When the capacity ratio is 1.2 or more, a positive electrode potential may be higher than 4.2 V at the time of charging, and thus the safety may be deteriorated (the positive electrode potential at this time means a potential with respect to Li potential).

The negative electrode capacity represents [the discharge capacity of the negative electrode], and the positive electrode capacity represents [the initial charge capacity of the positive electrode—the larger one of irreversible capacities of the negative electrode and the positive electrode]. Here, [the discharge capacity of the negative electrode] is defined as the capacity calculated by a charge-discharge device when lithium ions inserted in the negative electrode active material are desorbed. Also, [the initial charge capacity of the positive electrode] is defined as the capacity calculated by a charge-discharge device when lithium ions are desorbed from the positive electrode active material.

The capacity ratio of the negative electrode and the positive electrode can be calculated also from, for example, "the discharge capacity of the negative electrode/the discharge capacity of the lithium ion battery". For example, the discharge capacity of the lithium ion battery can be measured under the conditions of performing constant-current constant-voltage (CCCV) charge at 4.2 V and 0.1 to 0.5 C for a termination time of 2 to 5 hours, and then performing constant-current (CC) discharge to 2.7 V at 0.1 to 0.5 C. The discharge capacity of the negative electrode can be calculated by cutting the negative electrode of the lithium ion secondary battery whose discharge capacity is measured to a predetermined area, fabricating a monopolar cell using lithium metal as a counter electrode via a separator impregnated with an electrolytic solution, measuring a discharge capacity per predetermined area under the conditions of performing constant-current constant-voltage (CCCV) charge at 0 V and 0.1 C with a termination current of 0.01 C and then performing constant-current (CC) discharge to 1.5 V at 0.1 C, and converting the measured capacity into the total area used as the negative electrode of the lithium ion battery. In the monopolar cell, a direction where lithium ions are inserted into a negative electrode active material is defined as charge, and a direction where the lithium ions inserted in the negative electrode active material are desorbed is defined as discharge. Note that C means "current value (A)/discharge capacity of battery (Ah)".

EXAMPLE

Hereinafter, the embodiment will be described in more detail based on examples. Note that the present invention is not limited to the following examples.

[Fabrication of Positive Electrode Plate]

The positive electrode plate was fabricated in the following manner. Layered lithium nickel manganese cobalt composite oxide (NMC) and spinel lithium manganese oxide (sp-Mn) as positive electrode active materials were mixed with NMC/sp-Mn=30/70 (mass ratio). A scale-like graphite (average particle diameter: 20 μm) and acetylene black as conducting materials and polyvinylidene fluoride as a binding material were sequentially added into this mixture of positive electrode active materials and then mixed, thereby obtaining a mixture of positive electrode materials. The weight ratio of the active material, the conducting material, and the binding material was set to 90:5:5. Furthermore, N-methyl-2-pyrrolidone (NMP) as a dispersing solvent was added to the above-mentioned mixture and then kneaded, thereby forming a slurry. This slurry was applied substantially evenly and uniformly to both surfaces of an aluminum foil having a thickness of 20 μm serving as the current collector for the positive electrode. Thereafter, a drying process was performed and consolidation was carried out by pressing to obtain a predetermined density. The density of the positive electrode composite was set to 2.55 g/cm$^3$, and the application quantity of the positive electrode composite to one surface of the positive electrode current collector was set to 190 g/m$^2$.

[Fabrication of Negative Electrode Plate]

The negative electrode plate was fabricated in the following manner. Easily graphitizable carbon (d002=0.35 nm, average particle diameter (D50)=10 μm) or a mixture of easily graphitizable carbon and graphite (see Table 1) was used as the negative electrode active material. Polyvinylidene fluoride was added as a binding material to this negative electrode active material. The weight ratio of the negative electrode active material and the binding material was set to 92:8. Then, N-methyl-2-pyrrolidone (NMP) as a dispersing solvent was added thereto and then kneaded, thereby forming a slurry. This slurry was applied substantially evenly and uniformly by a specified quantity to both surfaces of rolled copper foil having a thickness of 10 μm serving as the current collector for the negative electrode. The negative electrode composite density was set to 1.15 g/cm$^3$.

[Fabrication of Battery] Fabrication of Laminated Battery

The positive electrode cut into a rectangle of 13.5 cm$^2$ was sandwiched by separators made of polyethylene porous sheet (trade name: HIPORE, thickness: 30 μm, Asahi Kasei Corporation), and the negative electrode cut into a rectangle of 14.3 cm$^2$ was layered thereon to prepare a laminated body. The laminated body was placed in an aluminum laminate container (trade name: ALUMINUM LAMINATE FILM, Dai Nippon Printing Co., Ltd.), and 1 mL of a nonaqueous electrolyte (trade name: SOL-RITE, Mitsubishi Chemical Corporation, a mixture solution of ethylene carbonate/methyl ethyl carbonate/dimethyl carbonate=2/2/3 (volume ratio) containing LiPF$_6$ of 1 M to which 0.8 mass % of vinylene carbonate with respect to the total amount of the mixture solution was added) was added thereto, and the aluminum laminate container was heat-welded to fabricate a battery for electrode evaluation.

[SOC at Potential to be 0.1 V with Respect to Lithium Potential]

SOC at a potential to be 0.1 V with respect to a lithium potential was measured at 25° C. in a CR2032 coin cell obtained by assembling the sample negative electrode punched to a size of ϕ 15 mm, a counter electrode (metal lithium) punched to a size of ϕ 16 mm, a separator punched to a size of ϕ 19 mm, and an electrolytic solution under argon atmosphere. The metal lithium having a surface from which an oxidized film was removed by polishing was used as the counter electrode.

As the electrolytic solution, 0.2 mL of a nonaqueous electrolyte (trade name: SOL-RITE, Mitsubishi Chemical Corporation, a mixture solution of ethylene carbonate/methyl ethyl carbonate/dimethyl carbonate=2/2/3 (volume ratio) containing LiPF$_6$ of 1 M to which 0.8 mass % of vinylene carbonate with respect to the total amount of the mixture solution was added) was used. As the separator, a separator made of a polyethylene porous sheet (trade name: HIPORE, thickness: 30 μm, Asahi Kasei Corporation) was used.

The obtained coin cell was charged to 0 V (V vs Li/Li$^+$) at a constant current having a current density of 0.1 C between the sample negative electrode and the counter electrode, and charged to a current density of 0.01 C at a constant voltage of 0 V. The coin cell was discharged to 1.5 V (V vs Li/Li$^+$) at a constant current having a current density of 0.1 C. Three cycles of the test for charge and discharge were performed. Note that "V vs Li/Li$^+$" is the potential of the sample negative electrode with respect to the potential of the counter electrode (metal lithium).

The charge capacity at the third cycle was defined as SOC 100%. SOC at the time of 0.1 V was calculated from the charge capacity before 0.1 V at the same third cycle.

SOC=CC charge capacity before 0.1 V at third cycle/ CCCV charge capacity before 0 V at third cycle Namely, a test battery, which includes a test negative electrode formed by cutting a part of a negative electrode of a lithium ion battery and a counter electrode made of metal lithium, is fabricated, the test battery is charged until the potential of the test negative electrode with respect to the potential of the counter electrode becomes 0 V in a state where a constant current having a current density of 0.1 C is made to flow, and then, a charge operation for charging the test battery until a current density becomes 0.01 C in a state where the potential of the test negative electrode with respect to the potential of the counter electrode is 0 V and a discharge operation for discharging the test battery after the charge operation are alternately repeated. Thus, the state of charge at a potential to be 0.1 V with respect to a lithium potential is a ratio of a charge capacity at the time when the potential of the test negative electrode with respect to the potential of the counter electrode becomes 0.1 V in the third charge operation to a charge capacity after the third charge operation is completed.

Examples 1 to 6

The mixture ratio of easily graphitizable carbon (d002=0.35 nm, average particle diameter (D50)=10 μm) and graphite (manufactured by Hitachi Chemical Co., Ltd.) as negative electrode active materials was set to 95/5 (Example 1), 90/10 (Example 2), 80/20 (Example 3), and 100/0 (Examples 4 to 6), and a negative electrode having the application quantity of a negative electrode composite at which a capacity ratio (negative electrode capacity/positive electrode capacity) becomes 1.13, 1.08, or 1.19 was fabricated. Then, a laminated cell was fabricated in accordance with the fabrication method described above. A ratio of a discharge capacity at a current value of 5 C/a discharge capacity at a current value of 0.5 C was used as discharge load characteristics, and a ratio of a charge capacity at a current value of 3 C/a charge capacity at a current value of 0.5 C was used as charge load characteristics. A charge-discharge device (TOSCAT-3200 manufactured by Toyo System Co., Ltd.) was used to evaluate the charge and discharge load characteristics. As an energy density, a volume energy density was calculated on an assumption of the case where the negative electrode was used for the above-mentioned 18650 battery.

Comparative Example 1

Non-graphitizable carbon (d002=0.37 to 0.38 nm, average particle diameter (D50)=9 μm) was used as a negative electrode active material, and a negative electrode having the application quantity of a negative electrode composite at which a capacity ratio becomes 1.13 was fabricated. Then, a laminated cell was fabricated in accordance with the fabrication method described above. A ratio of a discharge capacity at a current value of 5 C/a discharge capacity at a current value of 0.5 C was used as discharge load characteristics, and a ratio of a charge capacity at a current value of 3 C/a charge capacity at a current value of 0.5 C was used as charge load characteristics. A charge-discharge device (TOSCAT-3200 manufactured by Toyo System Co., Ltd.) was used to evaluate the charge and discharge load characteristics. As an energy density, a volume energy density was calculated on an assumption of the case where the negative electrode was used for the above-mentioned 18650 battery.

Comparative Example 2

Graphite (manufactured by Hitachi Chemical Co., Ltd.) was used as a negative electrode active material, and a negative electrode having the application quantity of a negative electrode composite at which a capacity ratio (negative electrode capacity/positive electrode capacity) becomes 1.13 was fabricated. Then, a laminated cell was fabricated in accordance with the fabrication method described above. A ratio of a discharge capacity at a current value of 5 C/a discharge capacity at a current value of 0.5 C was used as discharge load characteristics, and a ratio of a charge capacity at a current value of 3 C/a charge capacity at a current value of 0.5 C was used as charge load characteristics. A charge-discharge device (TOSCAT-3200 manufactured by Toyo System Co., Ltd.) was used to evaluate the charge and discharge load characteristics.

As an energy density, a volume energy density was calculated on an assumption of the case where the negative electrode was used for the above-mentioned 18650 battery.

Comparative Example 3

Comparative Example 3 was the same as Example 1 except that a negative electrode having the application quantity of a negative electrode composite at which a capacity ratio (negative electrode capacity/positive electrode capacity) becomes 1.3 was fabricated.

Figure 2:
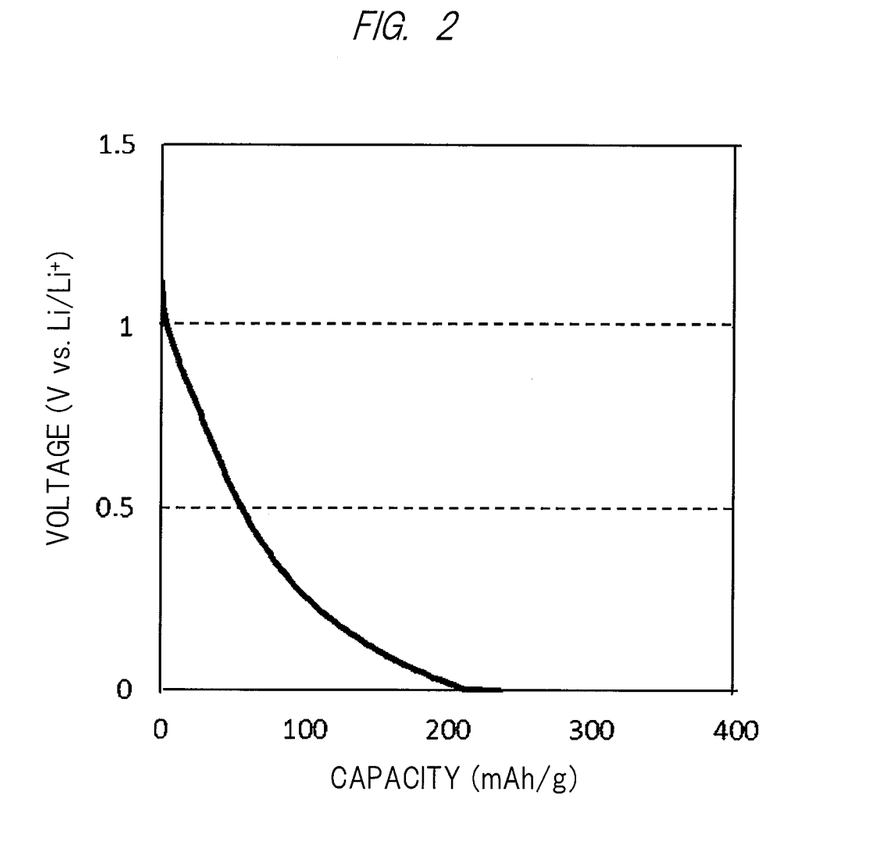
FIG. 2 is a charging curve of easily graphitizable carbon used as a negative electrode of each of Examples and Comparative Examples.
Figure 3:
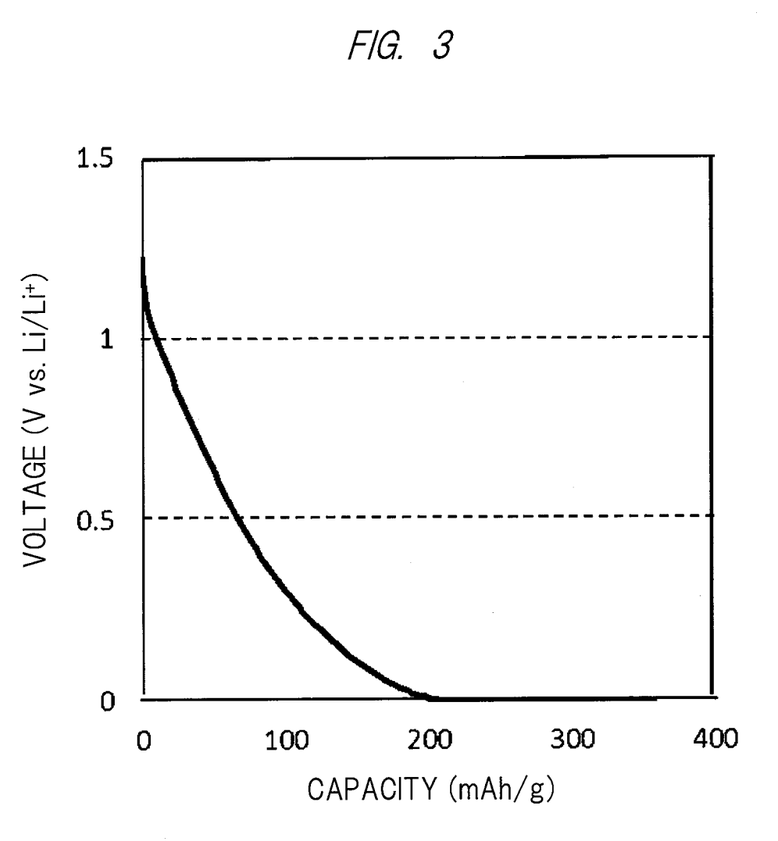
FIG. 3 is a charging curve of non-graphitizable carbon used as a negative electrode of each of Comparative Examples.
Figure 4:
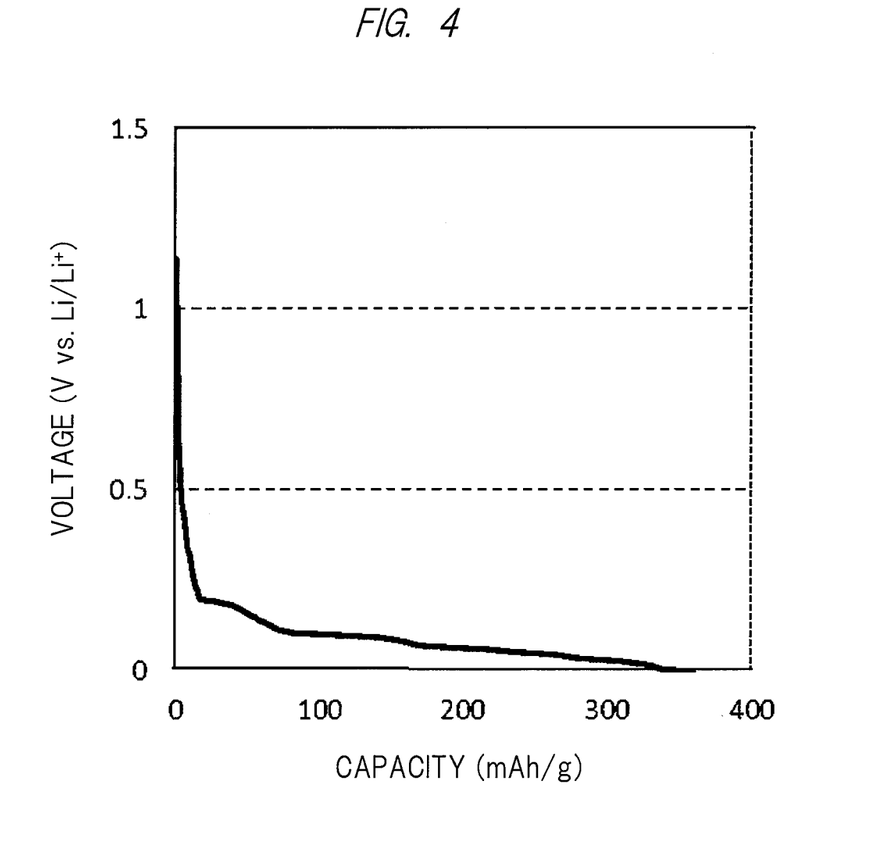
FIG. 4 is a charging curve of graphite used as a negative electrode of each of Examples and Comparative Examples.

The results of the above-described Examples and Comparative Examples are shown in the following Table 1. FIG. 2 shows the charging curve of easily graphitizable carbon used as the negative electrode of each of Examples and Comparative Examples. FIG. 3 shows the charging curve of non-graphitizable carbon used as the negative electrode of each of Comparative Examples. FIG. 4 shows the charging curve of graphite used as the negative electrode of each of Examples and Comparative Examples.

(The blending ratio of graphite and easily graphitizable carbon is a mass ratio)

As shown in Table 1, in Examples 1 to 6, a state of charge at a potential to be 0.1 V with respect to a lithium potential is 60% or more, and a capacity ratio (negative electrode capacity/positive electrode capacity) is 1 or more and less than 1.2. Meanwhile, in Comparative Examples 1 and 2, a capacity ratio (negative electrode capacity/positive electrode capacity) is 1 or more and less than 1.2, but a state of charge at a potential to be 0.1 V with respect to a lithium potential is less than 60%. In Comparative Example 3, a state of charge at a potential to be 0.1 V with respect to a lithium potential is 60% or more, but a capacity ratio (negative electrode capacity/positive electrode capacity) is 1.2 or more. Further, Examples 1 to 6 have larger 3C charge load characteristics than those in Comparative Examples 1 and 2 and higher energy densities than that in Comparative Example 3. From the foregoing, it is possible to provide a lithium ion battery, which includes a negative electrode in which a state of charge at a potential to be 0.1 V with respect to a lithium potential is 60% or more and a positive electrode containing lithium-containing composite metal oxide and has excellent input/output characteristics in the case where a capacity ratio of the positive electrode and the negative electrode (negative electrode capacity/positive electrode capacity) is 1 or more and less than 1.2.

REFERENCE SIGNS LIST

1 . . . lithium ion battery
2 . . . positive electrode plate
3 . . . negative electrode plate
4 . . . separator
5 . . . electrode group
6 . . . battery container

The invention claimed is:
1. A lithium ion battery, comprising:
 a negative electrode in which a state of charge at a potential to be 0.1 V with respect to a lithium potential is 60% or more; and
 a positive electrode containing a lithium-containing composite metal oxide, wherein the positive electrode includes a current collector and a positive electrode composite applied to at least one surface of the current collector, and
 a density of the positive electrode composite is 2.4 to 2.7 g/cm³,

TABLE 1

| Item | SOC at potential to be 0.1 V with respect to lithium potential (%) | Negative electrode capacity/positive electrode capacity | Graphite blending ratio (mass %) | 5C discharge load characteristics (%) | 3C charge load charactaristics (%) | Energy density (Wh/L) |
|---|---|---|---|---|---|---|
| Example 1 | 68 | 1.13 | 5 | 75 | 71 | 195 |
| Example 2 | 65 | 1.13 | 10 | 76 | 70 | 198 |
| Example 3 | 60 | 1.13 | 20 | 80 | 69 | 202 |
| Example 4 | 70 | 1.13 | 0 | 72 | 73 | 193 |
| Example 5 | 70 | 1.08 | 0 | 71 | 70 | 198 |
| Example 6 | 70 | 1.19 | 0 | 74 | 75 | 187 |
| Comparative Example 1 | 50 | 1.13 | 0 | 51 | 41 | 202 |
| Comparative Example 2 | 40 | 1.13 | 100 | 94 | 51 | 231 |
| Comparative Example 3 | 70 | 1.30 | 0 | 76 | 77 | 177 | wherein a capacity ratio of the positive electrode and the negative electrode (negative electrode capacity/positive electrode capacity) is 1 or more and less than 1.2.

2. The lithium ion battery according to claim 1, wherein the lithium-containing composite metal oxide contains layered lithium nickel manganese cobalt composite oxide (NMC) and spinel lithium manganese oxide (sp-Mn).

3. The lithium ion battery according to claim 2, wherein a mass ratio (NMC/sp-Mn) of the layered lithium nickel manganese cobalt composite oxide (NMC) and the spinel lithium manganese oxide (sp-Mn) is 10/90 or more and 65/35 or less.

4. The lithium ion battery according to claim 2, wherein the layered lithium nickel manganese cobalt composite oxide is represented by a following composition formula (Chem. 1), $$Li_{(1+\delta)}Mn_xNi_yCo_{(1-x-y-z)}M_zO_2 \qquad \text{(Chem. 1)}$$

where $-0.15<\delta<0.15$, $0.1<x\leq0.5$, $0.6<x+y+z\leq1.0$, and $0\leq z\leq0.1$ are satisfied.

5. The lithium ion battery according to claim 2, wherein the spinel lithium manganese oxide is represented by a following composition formula (Chem. 2), $$Li_{(1+\eta)}Mn_{(2-\lambda)}M'_\lambda O_4 \qquad \text{(Chem. 2)}$$

where $0\leq\eta\leq0.2$ and $0\leq\lambda\leq0.1$ are satisfied.

6. The lithium ion battery according to claim 1, wherein the negative electrode includes a current collector and a negative electrode composite applied to at least one surface of the current collector, and a density of the negative electrode composite is 0.7 to 2 g/cm$^3$.

* * * * *